(12) United States Patent  
Gunter et al.

(10) Patent No.: US 9,132,448 B2  
(45) Date of Patent: Sep. 15, 2015

(54) APPARATUS FOR RADIANT ENERGY CURING OF A COATING

(71) Applicant: Miltec Corporation, Stevensville, MD (US)

(72) Inventors: John Gunter, Stevensville, MD (US); Jerome Kreman, Pikesville, MD (US)

(73) Assignee: Miltec Corporation, Stevensville, MD (US)

( * ) Notice: Subject to any disclaimer, the term of this patent is extended or adjusted under 35 U.S.C. 154(b) by 0 days.

(21) Appl. No.: 14/150,266

(22) Filed: Jan. 8, 2014

(65) Prior Publication Data

US 2015/0108370 A1    Apr. 23, 2015

Related U.S. Application Data

(63) Continuation-in-part of application No. 14/061,236, filed on Oct. 23, 2013.

(51) Int. Cl.
| | |
|---|---|
| *B05D 3/06* | (2006.01) |
| *B05C 9/14* | (2006.01) |
| *F21V 7/04* | (2006.01) |
| *G02B 5/08* | (2006.01) |
| *F21V 7/00* | (2006.01) |

(52) U.S. Cl.
CPC ... *B05D 3/06* (2013.01); *B05C 9/14* (2013.01); *B05D 3/067* (2013.01); *F21V 7/0025* (2013.01); *F21V 7/04* (2013.01); *G02B 5/0891* (2013.01)

(58) Field of Classification Search
CPC ........ F26B 13/002; F26B 3/28; B01J 19/121; B01J 19/123; B29C 35/10; B29C 35/0288; B29C 35/0888; B29C 47/00; B29C 47/0014; B29C 71/04; C03C 25/10; C03C 25/12; C03C 25/18; A61L 2/08; A61L 2/10; G02B 19/0023; G02B 19/0047; G02B 19/0017; G02B 19/0095
USPC .......... 250/504 R, 492.1, 455.11, 432 R, 438, 250/454.11, 493.1, 496.1, 503.1; 359/858, 359/22, 32, 33; 264/1.27, 493, 495; 362/298, 346, 350, 811; 427/163.2, 427/561, 568
See application file for complete search history.

(56) References Cited

U.S. PATENT DOCUMENTS

| | | | |
|---|---|---|---|
| 4,099,837 A | 7/1978 | Vazirani | |
| 4,115,087 A | 9/1978 | Martin | |
| 4,324,575 A | 4/1982 | Levy | |
| 4,359,668 A | 11/1982 | Ury | |
| 4,514,037 A | 4/1985 | Bishop et al. | |
| 4,591,724 A * | 5/1986 | Fuse et al. | 250/492.1 |
| 4,710,638 A * | 12/1987 | Wood | 250/492.1 |
| 4,913,859 A * | 4/1990 | Overton et al. | 264/1.27 |
| 5,247,178 A * | 9/1993 | Ury et al. | 250/438 |
| 5,298,759 A * | 3/1994 | Brewer et al. | 250/492.1 |

(Continued)

*Primary Examiner* — David A Vanore  
(74) *Attorney, Agent, or Firm* — Dority & Manning, P.A.

(57) ABSTRACT

Devices and methods for curing materials with radiant energy are described. The devices include a first reflector and a second reflector that are semi-ellipses. The ellipses that define the first reflector and the second reflector have axes of different lengths, and the reflectors are aligned such that the focal points of the reflectors are overlaid. A radiative energy source at a near focal point of a reflector can provide energy to cure a coating on a substrate at a far focal point of the reflector. The different sizes of the two reflectors decrease focusing error of the radiative energy and provide improved efficiency to the curing system.

27 Claims, 11 Drawing Sheets

(56) References Cited

U.S. PATENT DOCUMENTS

| | | | |
|---|---|---|---|
| 5,311,335 A * | 5/1994 | Crabtree | 359/22 |
| 6,419,743 B1 * | 7/2002 | Stowe | 118/67 |
| 6,419,749 B1 | 7/2002 | Rhoades | |
| 6,511,715 B2 | 1/2003 | Rhoades | |
| 6,626,561 B2 * | 9/2003 | Carter et al. | 362/298 |
| 6,841,790 B1 | 1/2005 | Phillips et al. | |
| 7,923,706 B2 * | 4/2011 | Brassell et al. | 250/504 R |
| 7,964,858 B2 * | 6/2011 | Yang et al. | 250/504 R |
| 8,101,931 B2 | 1/2012 | Blanford, III | |
| 8,507,884 B2 * | 8/2013 | Swain et al. | 250/504 R |

\* cited by examiner

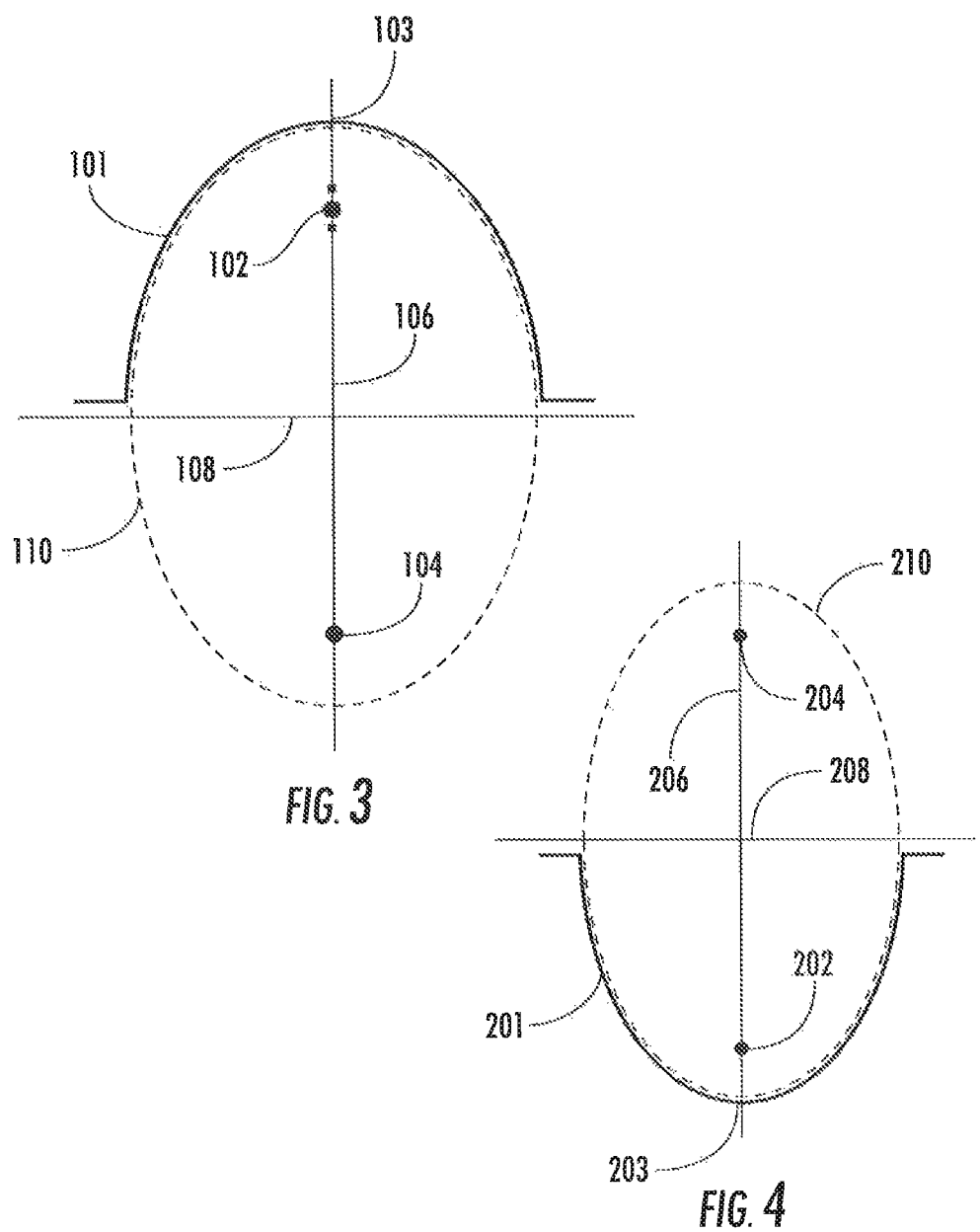

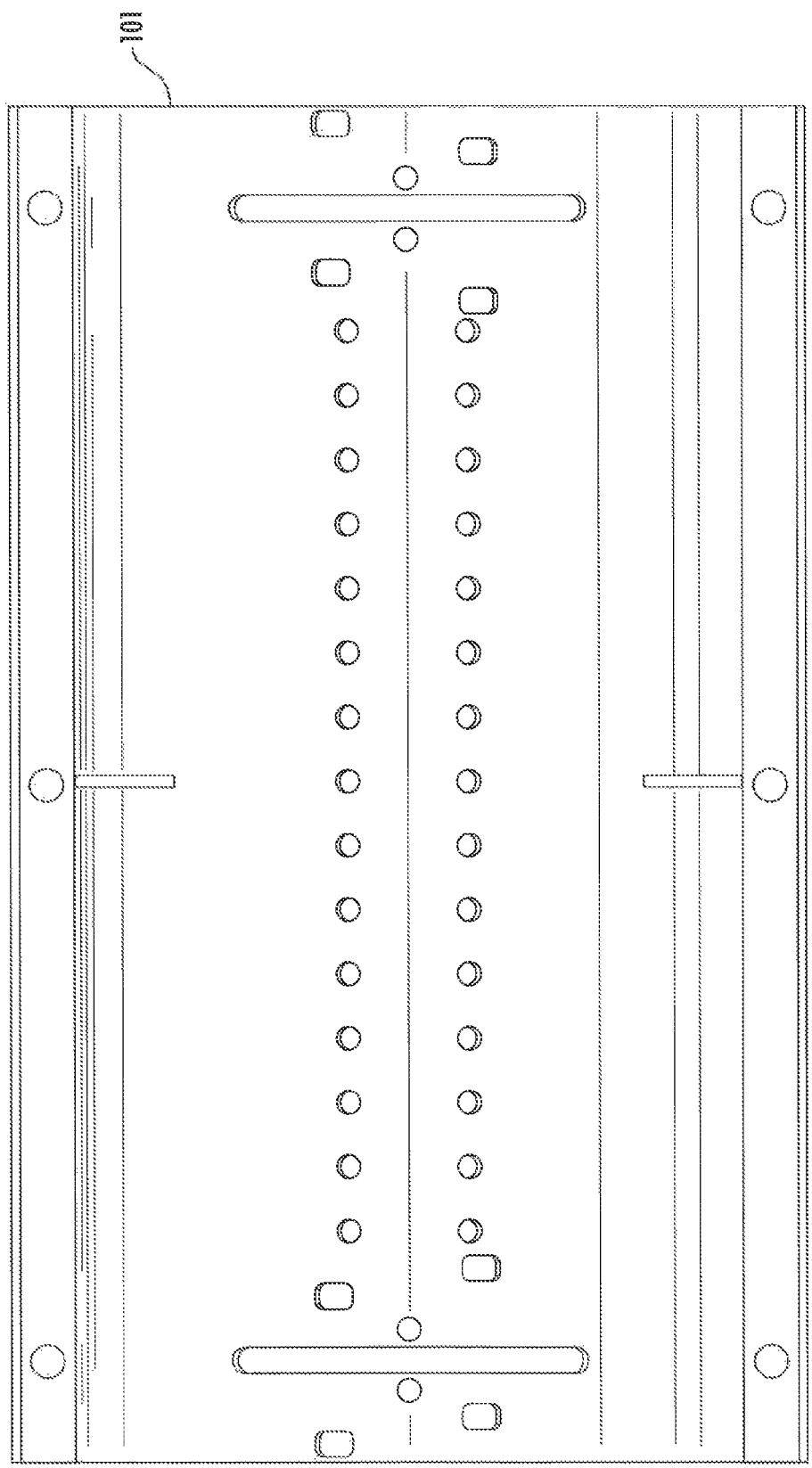

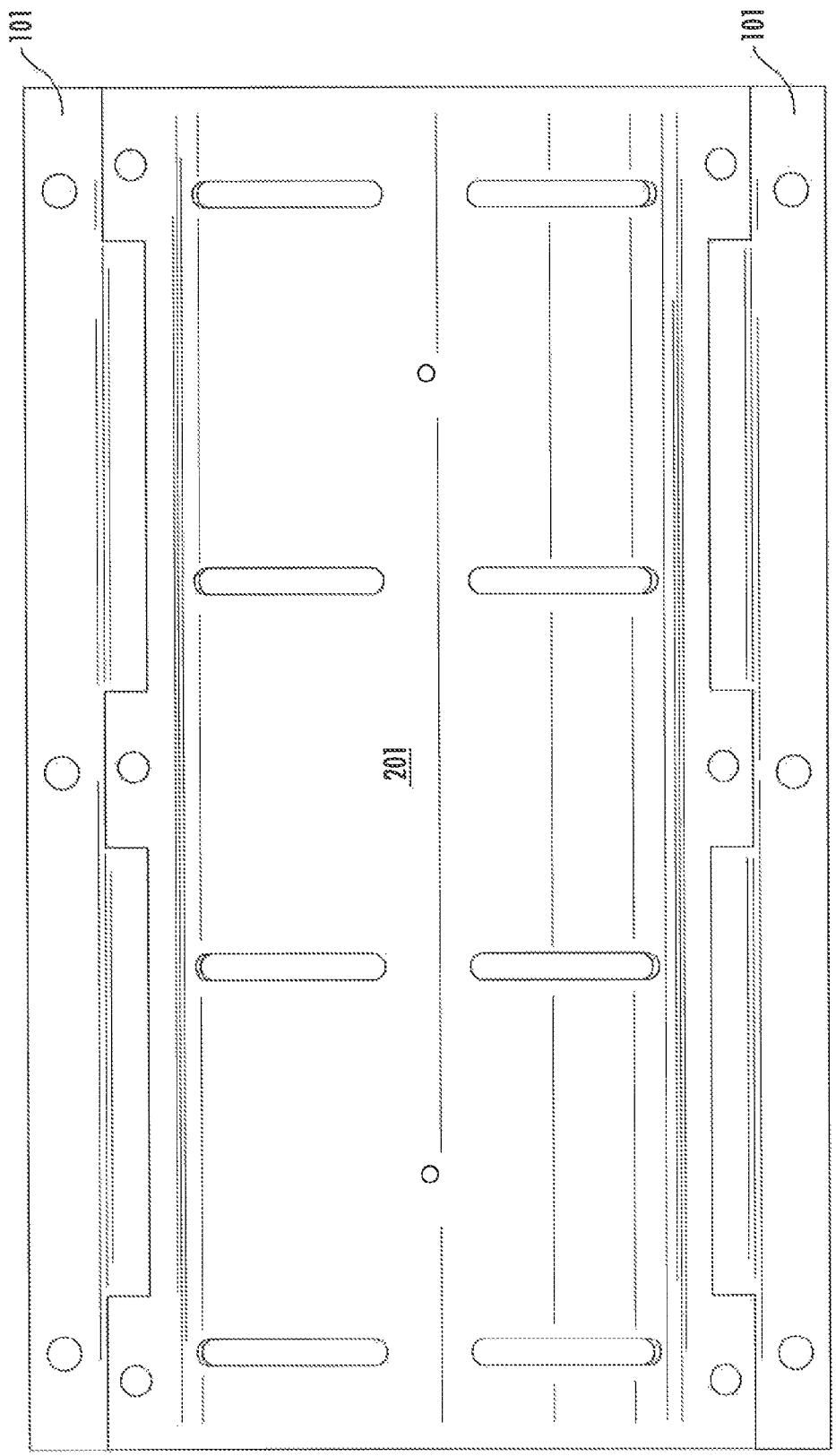

APPARATUS FOR RADIANT ENERGY CURING OF A COATING

CROSS REFERENCE TO RELATED APPLICATION

The present application is a Continuation-In-Part application of U.S. patent application Ser. No. 14/061,236 having a filing date of Oct. 23, 2013, which is incorporated herein in its entirety.

BACKGROUND

High aspect ratio materials such as fibers, rods, filaments, etc. are often coated with a polymeric material for protective or other purposes. For instance, optical fibers as are used to transmit light in various applications, including communications, typically are coated with one or more polymeric layers that are designed to protect the optical fibers from moisture and abrasion, to reduce microbending losses, to allow easier handling of the fiber and to simplify identification of the individual fibers in a bundle (e.g. coloring.)

In a typical method for coating an optical fiber, a liquid photocurable polymeric material is first applied to the surface of the fiber. This coating is then cured, for instance by irradiating the fiber with radiant energy, e.g., ultraviolet energy.

A variety of devices have been designed for irradiative curing of such coatings. For instance, U.S. Pat. No. 4,710,638 to Wood describes an apparatus for treating polymeric coatings with radiant energy. The apparatus includes first and second reflectors that together form a single ellipse, a light source positioned at one focus of the ellipse formed by the two reflectors and an auxiliary reflector near the second focus of the ellipse. A polymer-coated fiber can be positioned at the second focus and radiant energy from the light source can cure the polymer. U.S. Pat. Nos. 6,419,749 and 6,511,715, both to Rhoades describe a similar device that includes two reflectors that together form a single ellipse and a light source positioned at one focus of the ellipse. The devices of Rhoades also include first and second concentric tubes. Ultraviolet light from the light source passes through the first tube to cure the coating on a filament passing therethrough, and the second concentric tube reflects infrared light and passes ultraviolet light to prevent burning and destroying the coating on the filament as it passes through the first tube. U.S. Pat. No. 6,626,561 to Carter, et al. describes another similar device, with the inclusion of end reflectors on the first reflector that can have mounts for the lamp bulb.

All such previously known optical systems include the basic design as illustrated in FIG. 1 and FIG. 2 that includes two elliptical-shaped reflectors 1, 25, which are positioned such that the cross section of the primary and secondary reflectors form a single ellipse. As the primary 1 and secondary 25 reflectors form a single ellipse, the near focal point 2 of the primary reflector 1 is coincident with the far focal point 2 of the secondary reflector 25. Likewise, the far focal point 4 of the primary reflector 1 is coincident with the near focal point 4 of the secondary reflector 25. The primary and secondary reflectors share the same major axis. A light source 10 is suspended in the elliptical space, at or near the near focal point 2 on the major axis that is closest to the primary reflector 1. The material to be exposed to the radiant energy, such as an optical fiber, is located in the elliptical space substantially coincident with the focal point 4 that is farthest from the primary reflector 1, for instance within a quartz tube 7.

While such devices describe various improvements in the art, problems still exist with such devices. For instance, as manufacturing production rates are limited by the efficiency of the radiant energy transfer to the material to be cured or exposed, the manufacturer must add additional radiant exposure units to improve production rates, which increases capital costs, operating costs, and maintenance costs. Attempts have been made to improve the efficiency of the coating and curing process by techniques such as addition of the additional reflectors to the system as described by Woods and Carter, et al., by modifying the polymeric composition and/or the coating method, and by selecting optimal wavelengths of the curing radiation.

Room for further improvement in the art exists. For instance, what are needed in the art are devices that provide more efficient use of the radiant energy that cures the polymer.

SUMMARY

Aspects and advantages of the invention will be set forth in part in the following description, or may be obvious from the description, or may be learned through practice of the invention.

According to one embodiment, disclosed is a device for curing a coating by use of radiant energy, e.g., actinic radiation, electron beam radiation, etc. For example, a device can include a primary reflector having a cross sectional shape that corresponds to an end portion of a first ellipse. This first ellipse has a major axis and a minor axis and a near focal point and a far focal point. The major axis of the first ellipse bisects the primary reflector at a first point. The near focal point of the first ellipse is closer to this first point of bisection than is the far focal point of the first ellipse.

The device also includes a secondary reflector. A cross sectional shape of the secondary reflector corresponds to an end portion of a second ellipse. The second ellipse has a major axis and a minor axis and a near focal point and a far focal point. The major axis of the second ellipse bisects the secondary reflector at a second point. The near focal point of the second ellipse is closer to this second point of bisection than is the far focal point of the second ellipse. The major axis of the first ellipse and the major axis of the second ellipse are different lengths and the minor axis of the first ellipse and the minor axis of the second ellipse are different lengths. The primary and secondary reflectors are aligned such that the major axis of the first ellipse is collinear with the major axis of the second ellipse. In addition, the primary and secondary reflectors are aligned such that the near focal point of the first ellipse essentially corresponds with the far focal point of the second ellipse and such that the far focal point of the first ellipse essentially corresponds with the near focal point of the second ellipse.

The device can also include a source for the radiant energy. The radiant energy source can be located in the device such that it substantially overlays the near focal point of the first ellipse and the far focal point of the second ellipse.

Also disclosed is a method for curing a polymeric coating on a high aspect ratio substrate. The method generally includes passing the coated high aspect ratio substrate along a line that passes through a point that essentially overlays the far focal point of the first ellipse and the near focal point of the second ellipse. This line also runs essentially perpendicular to the major axes of the first and second ellipse. As the substrate passes along this line, the energy source emits radiant energy that impinges upon the high aspect ratio substrate and cures the polymeric coating.

According to another embodiment, disclosed is a reflector for a device for curing a coating by use of radiant energy. The reflector has a cross sectional shape that corresponds to an end portion of an ellipse. This ellipse can be defined by a major axis and a minor axis. The reflector is smaller than reflectors previously known for such devices. For instance, the major axis of the ellipse that defines the reflector shape can have a length of from about 5.10 inches to about 5.75 inches and the minor axis can have a length of from about 2.70 inches to about 4.05 inches.

In another embodiment, disclosed is a kit of replacement parts for a device for curing a coating by use of radiant energy. For instance, the kit can include a primary reflector and a secondary reflector, and the two reflectors can be of different sizes. More specifically, the two reflectors can have cross sectional shapes that are defined by two ellipses, the first ellipse can define the primary reflector and can have a major axis that is larger than the major axis of the second ellipse, which defines the secondary reflector, and the first ellipse can have a minor axis that is larger than the minor axis of the second ellipse. Both ellipses will have first and second focal points, as is known. The distance between the first and second focal points of the first ellipse can be essentially the same as the distance between the first and second focal points of the second ellipse.

BRIEF DESCRIPTION OF THE FIGURES

A full and enabling disclosure of the present invention, including the best mode thereof, directed to one of ordinary skill in the art, is set forth in the specification, which makes reference to the appended figures, in which:

FIG. 3 illustrates the geometry of a primary reflector in a device as described herein.

FIG. 4 illustrates the geometry of a secondary reflector in a device as described herein.

FIG. 11 is a bottom view of the primary assembly of the reflector system of FIG. 7.

FIG. 12 is a top view of the secondary assembly of the reflector system of FIG. 7.

DETAILED DESCRIPTION

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In one embodiment, disclosed herein is an apparatus that may be used for exposing or curing materials with radiant energy. In another embodiment, disclosed are components as may be utilized in such a device. In one particular embodiment, one or more of the components may be provided as replacement parts for a device, for instance provided in a kit. The device can be particularly beneficial for curing photocurable polymeric materials on a high aspect ratio substrate such as, for instance, an optical fiber, a fiber, a filament, a yarn, a cable, a pipe, a conduit, and so forth.

Figure 1:
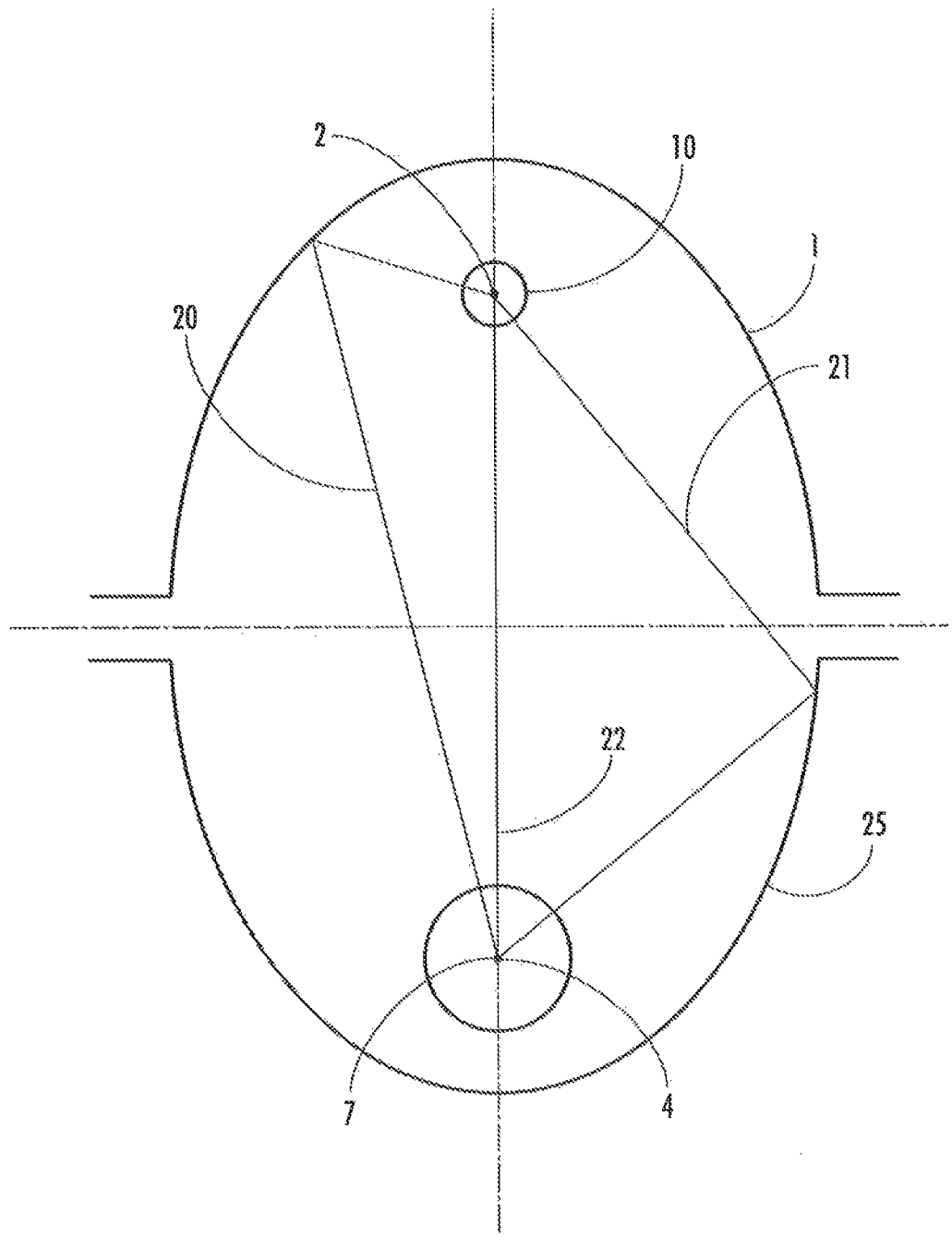
FIG. 1 is a diagram depicting radiant energy paths in a prior art elliptical reflector system.

Benefits of the presently disclosed system include more efficient targeting of the radiative curing energy through recognition of targeting errors in prior art reflector systems. FIG. 1 illustrates a prior art device including a primary reflector 1, a secondary reflector 25, a first focal point 2, a second focal point 4, and a radiant energy source 10. As discussed above, the radiant energy source emits energy waves that are targeted from the first focal point 2 to the second focal point 4, with the coated substrate located at the second focal point 4, for instance within a quartz tube 7. As shown, radiant energy from the source 10 to the substrate can generally take one of three paths, either straight across the system 22, on a path 20 that reflects off of the primary reflector 1, or on a path 21 that reflects off of the secondary reflector 25.

Figure 2:
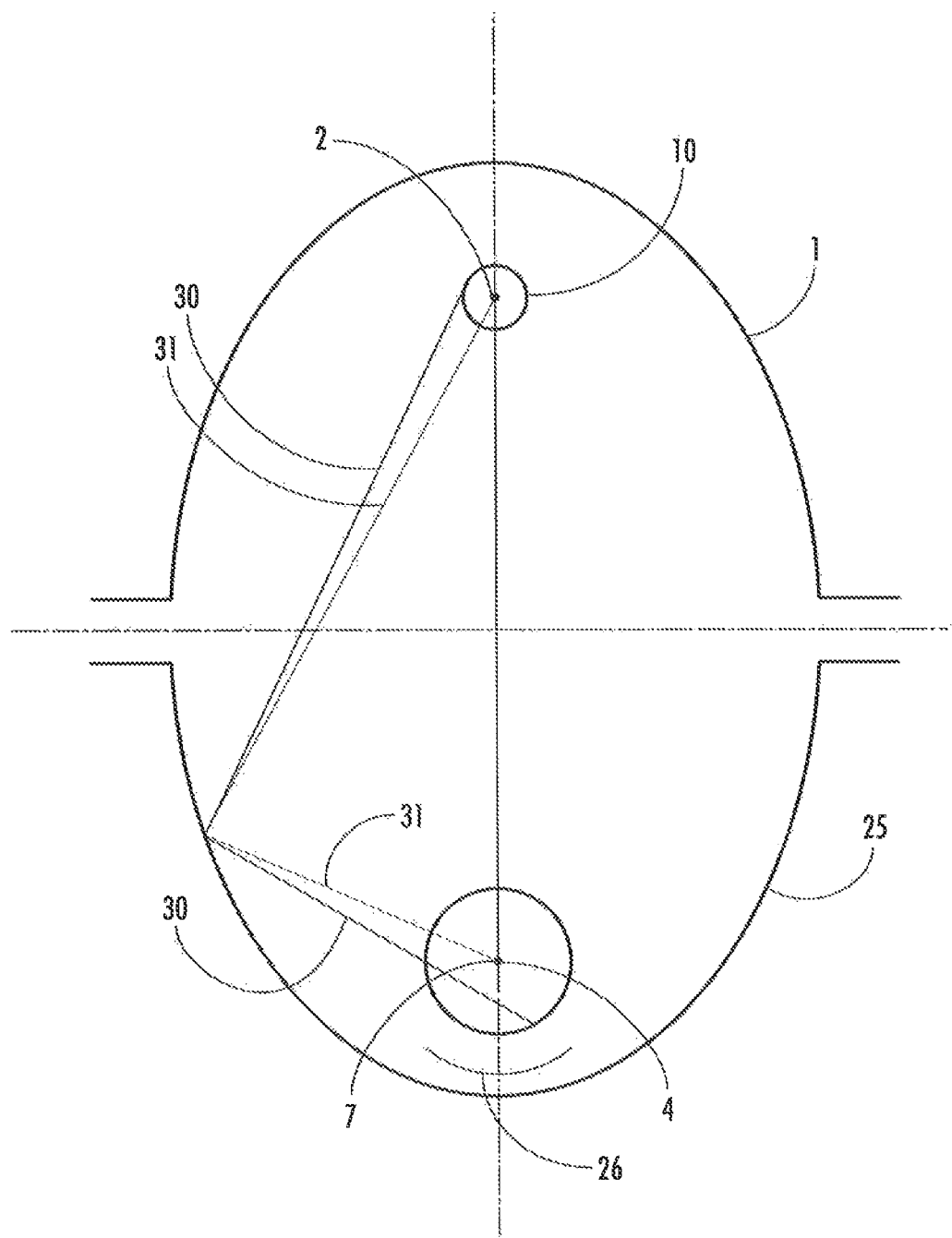
FIG. 2 is a diagram depicting the optical error introduced by volume radiant sources in a prior art elliptical reflector system.

In reality, the radiant energy source 10 is not a point source located at the focal point 2. Rather, and as illustrated in FIG. 2, the radiant energy source 10 is a volume energy source, with the energy emanating from the surface of a source 10 rather than from the center point that corresponds to the focal point 2. As shown in FIG. 2, an actual energy wave 30 will emanate from the surface of the radiant energy source 10 near the primary reflector 1. As shown, following reflection off of the wave 30 off of the secondary reflector 25, the wave does not strike the target that is at the second focal point 4. Rather, the actual energy wave 30 misses the target all together. The presence of an additional reflector 26 does not alleviate this problem. In contrast, the theoretical energy wave 31, for which the prior art system has been designed, originates at a theoretical point source located at the focal point 2 near the primary reflector 1, strikes the secondary reflector 25, and converges on the focal point 4. As the origin of the theoretical wave 31 moves away from the focal point 2 to the actual wave 30, optical errors are introduced that scatter the energy wave away from the focal point 4, reducing the radiant energy delivered to the substrate that carries the polymer to be cured.

The error at the target in the prior art systems of FIG. 1 and FIG. 2 can be approximated by the equation:

$$\text{Error at Target} = [\text{distance travelled}] \times \tangent(\phi)$$

where $\phi$ is the difference in angle of incidence between the theoretical wave 31 from the point source at focal point 2 and the actual wave from the surface of the radiant energy source 10.

The loss of energy at the target from this error can be substantial. As previously mentioned and as illustrated in FIG. 1, most of the radiant energy takes one of three paths from the radiant energy source to the target (material to be cured or exposed):

Path 20: Radiant source 10→Reflector 1→Target 4
Path 21: Radiant source 10→Reflector 25→Target 4
Path 22: Radiant source 10→Target 4

Approximately 73% of the radiant energy strikes the primary reflector 1 first and then reflects to the target 4 on Path 20. Less than 2% of the radiant energy travels directly from the radiant energy source 10 to the target 4 on Path 22. Approximately 22% of the radiant energy strikes the secondary reflector 25 first and then reflects to the target 4 on Path 21. The exact amount of radiant energy that travels along each path is dictated by the relative sizes of the primary reflector 1 and the radiant energy source 10.

The presently disclosed devices can increase the efficiency of the energy transfer from a radiant energy source to a target that passes along this path. By use of the disclosed devices, the amount of radiant energy impinging on the target via this path, and thus the total amount of energy transferred to the target from the radiant energy source, can be increased.

The reflector system of the disclosed devices utilizes a primary reflector 101, the cross sectional geometry of which is illustrated in FIG. 3, and a secondary reflector 201, the cross sectional geometry of which is illustrated in FIG. 4. The primary reflector 101 has a cross sectional shape that corresponds to an end portion of an ellipse 110 (e.g., a semi-ellipse). The ellipse 110 is defined by a major axis 106, a minor axis 108, a near focal point 102 and a far focal point 104, as shown. The primary reflector 101 corresponds to the ellipse 110 such that the major axis 106 bisects the primary reflector 101 at the point 103, as shown. In addition, the near focal point 102 of the ellipse 110 is closer to this point of bisection than is the far focal point 104. This near focal point 102 of the ellipse 110 can also be referred to as the near focal point 102 of the primary reflector 101 and the far focal point 104 of the ellipse 110 can also be referred to as the far focal point 104 of the primary reflector 101. In one embodiment, the major axis of the ellipse 110 can be from about 5.8 inches to about 6.5 inches, or from about 5.9 inches to about 6.2 inches and the minor axis of the ellipse 110 can be from about 4.1 inches to about 4.5 inches, or from about 4.2 inches to about 4.3 inches, in one embodiment.

The secondary reflector 201 has a similar geometry in that it has a cross sectional shape that corresponds to an end portion of an ellipse 210 (e.g., a semi-ellipse). The ellipse 210 is defined by a major axis 206, a minor axis 208, a near focal point 202 and a far focal point 204, as shown. The secondary reflector 201 corresponds to the ellipse 210 such that the major axis 206 bisects the secondary reflector 201 at the point 203, as shown. In addition, the near focal point 202 of the ellipse 210 is closer to this point of bisection than is the far focal point 204. The near focal point 202 of the ellipse 210 can also be referred to as the near focal point 202 of the secondary reflector 201 and the far focal point 204 of the ellipse 210 can also be referred to as the far focal point 204 of the secondary reflector 201. In one embodiment, the major axis of the ellipse 210 can be from about 5.10 inches to about 5.75 inches, for instance from about 5.2 inches to about 5.6 inches, and the minor axis of the ellipse 210 can be from about 2.70 inches to about 4.05 inches, for instance from about 2.8 inches to about 4.0 inches.

In one embodiment, the relative sizes of the primary and secondary reflectors can be reported as a ratio of the axes of the two ellipses that describe the reflectors. For example, the major axis 206 of the ellipse 210 that describes the secondary reflector 201 can be from about 84% to about 95%, or from about 88% to about 92%, of the length of the major axis 106 of the ellipse 110 that describes the primary reflector 101. The minor axis 208 of the ellipse 210 that describes the secondary reflector 201 can be from about 63% to about 96%, or from about 70% to about 90% of the length of the minor axis 108 of the ellipse 110 that describes the primary reflector 101.

The two ellipses 110, 210 that define the shapes of the reflectors 101, 201, respectively, differ from one another with regard to the length of the major axes 106, 206, and the length of the minor axes 108, 208. For example, in the illustrated embodiment, the major axis 106 of the ellipse 110 is longer than the major axis 206 of the ellipse, and the minor axis 108 of the ellipse 110 is longer than the minor axis 208 of the ellipse 210. The distance between the two focal points of each ellipse is essentially equivalent, i.e., the distance between the two focal points 102 and 104 of the first ellipse 110 is essentially the same as the distance between the two focal points 202, 204 of the second ellipse 210. As utilized herein the term 'essentially the same' with regard to distance or location generally refers to two values that are the same as one another, within about 10% of one another in some embodiments, or within about 5% of one another in some embodiments.

Figure 5:
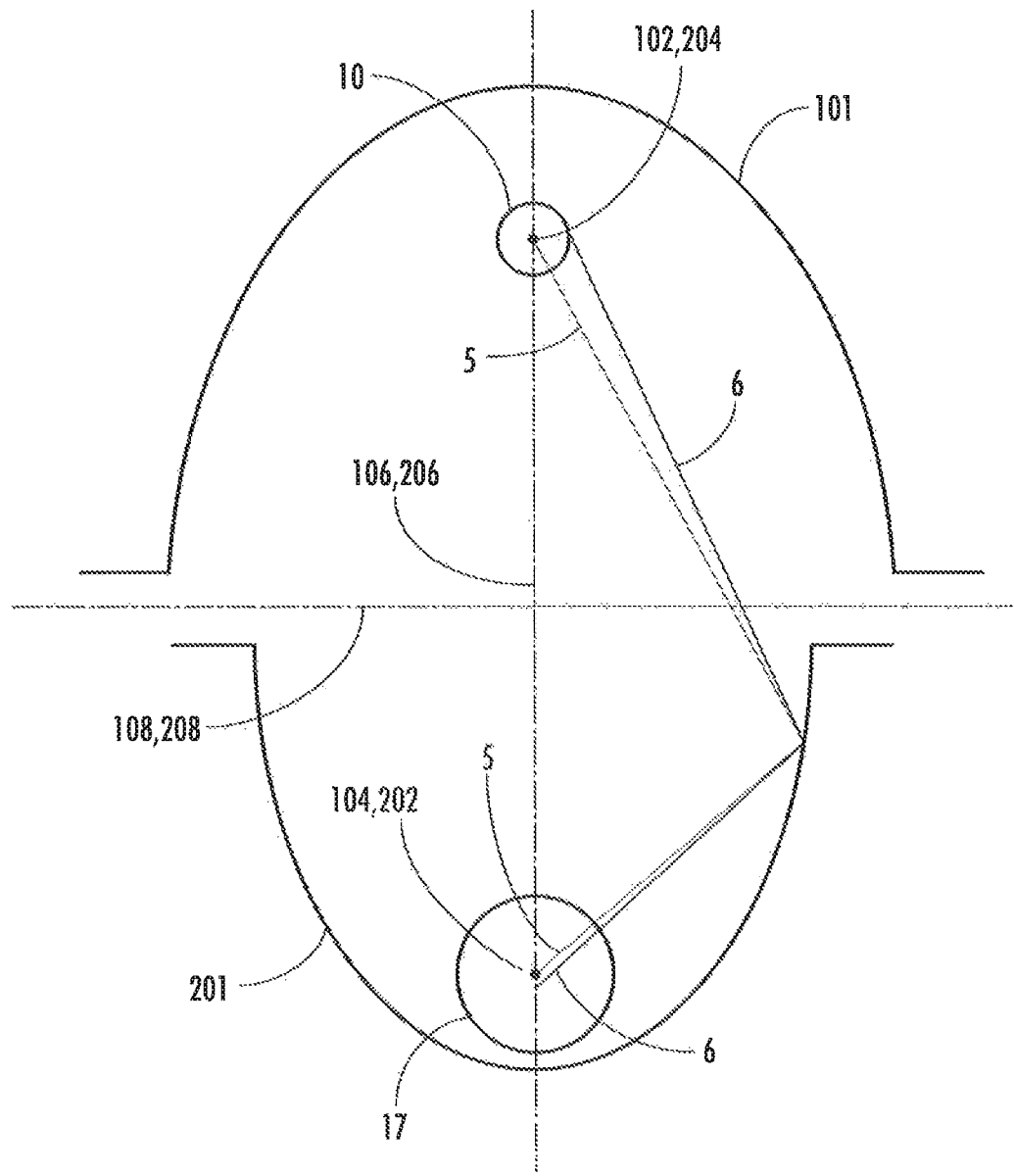
FIG. 5 is a schematic of one embodiment of a reflector system as disclosed herein.

The reflector system includes the first and second reflectors aligned with one another to form a cavity there between. For instance, as illustrated in FIG. 5, the primary reflector 101 and the secondary reflector 201 are aligned with one another such that the major axes 106, 206 are collinear and the minor axes 108, 208, are also collinear. In addition, upon alignment of the primary reflector 101 with the secondary reflector 201, the near focal point 102 of the ellipse 110/reflector 101 overlays the far focal point 204 of the ellipse 210/reflector 201, and the far focal point 104 of the ellipse 110/reflector 101 overlays the near focal point 202 of the ellipse 210/reflector 201.

FIG. 5 also illustrates a radiant energy source 10 located at the near focal point 102. During use, a theoretical energy wave 5 emitted from the overlaid focal points 102, 204 can reflect off of the secondary reflector 201 and can impinge upon the focal points 104, 202, as shown. This would be the case for a theoretical energy wave 5 that was emitted from a point source at the focal points 102, 204. As mentioned above, however, the radiant energy source 10 is not a point source, but rather is a volume source from which radiant energy is emitted at the surface of the source 10. Energy wave 6 of FIG. 5 illustrates the more realistic path of the energy that is emitted from the radiant energy source 10. As can be seen, the error of wave 6 within the area 17 is quite small, and the two energy waves 5, 6 come very close to overlapping. Due to the smaller size of the secondary reflector 201, the light that strikes the secondary reflector 201 travels a shorter distance to the target as compared to the light that strikes the larger secondary reflector of the previously known systems, which reduces the resulting error at the target when compared to current systems in which the two reflectors are of equal size. By use of the disclosed systems, more of the radiant energy that reflects from the secondary reflector 201 strikes the target. Thus, a product to be cured or exposed within the area 17, which can be located at a spot that is essentially coincident with the focal points 104, 202, can receive a larger amount of the radiant energy from the source 10 as compared to previously known reflector systems.

If the secondary reflector is exceedingly small as compared to the primary reflector, a proportion of energy can be lost at the junction between the two reflectors, either from blocking energy that reflects from the primary reflector near the junction of the two reflectors, or blocking energy that is directed from the energy source to the junction. Blocking of excessive amounts of energy at the junction between the two reflectors can reduce the amount of radiant energy that reaches the target, which can offset the gains from the disclosed design. In addition, if the secondary reflector gets too small, it will mechanically impinge on the material to be cured. Thus, the disclosed secondary reflectors have been designed so as to better focus the radiant energy on the target without losing excessive amounts of the radiant energy at the junction between the primary and secondary reflectors.

Figure 6:
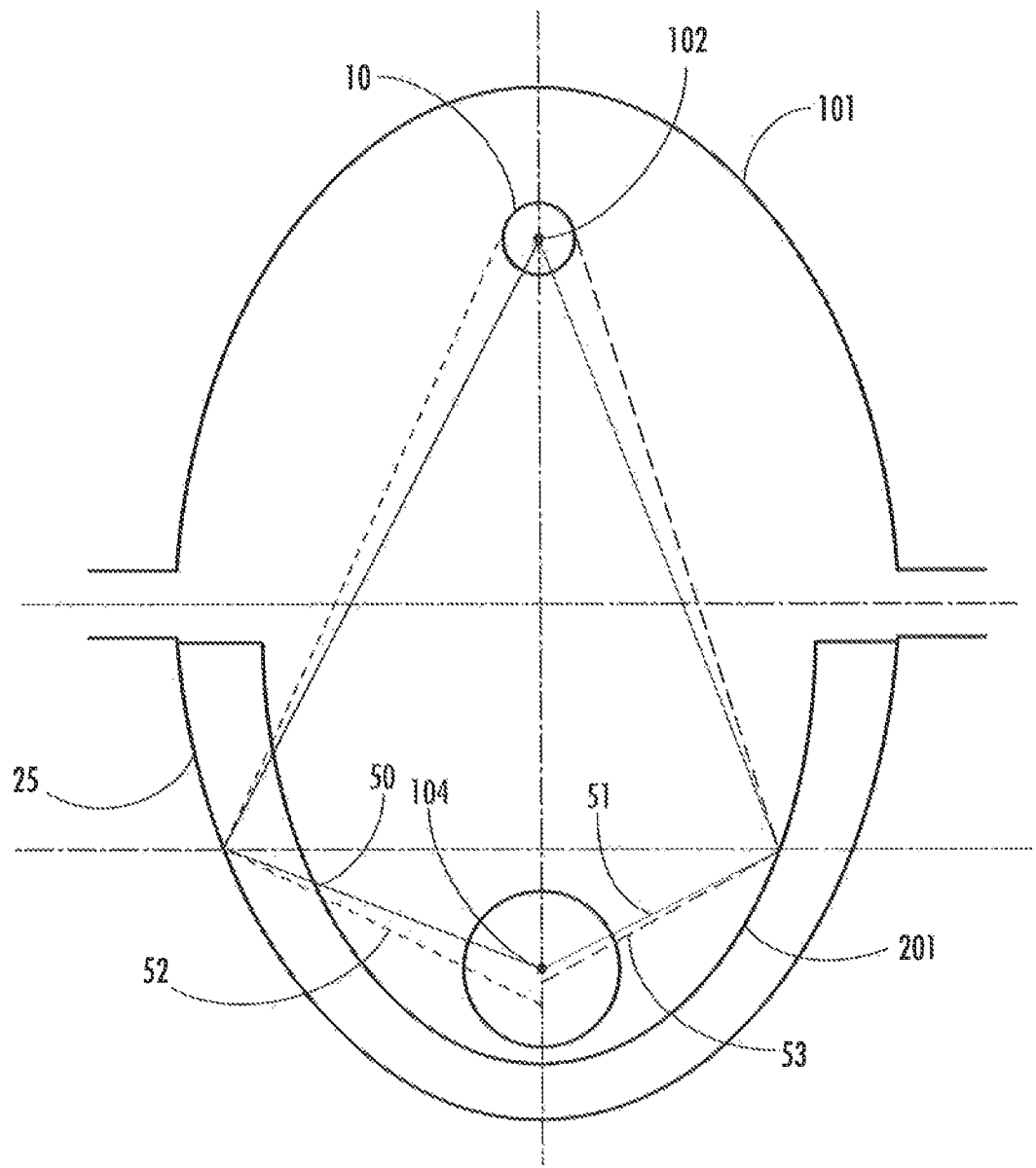
FIG. 6 illustrates an overlay of a prior art reflector system and a reflector system as disclosed herein.

FIG. 6 illustrates an overlay of a secondary reflector 25 sized according to previous practice with a secondary reflector 201 of the disclosed system, both of which are aligned with a primary reflector 101 as described. As can be seen, the disclosed system can reduce the impact of scattering and can increase the amount of radiant energy that reflects from he secondary reflector 201 and strikes the target at 104.

The energy waves that strike a secondary reflector from a volume source have an angular error CD, where CD is the difference in angle of incidence between the theoretical wave from a point source and the actual wave from a volume source. As illustrated in FIG. 6, the theoretical wave 51 that emanates from the point source at the near focal point 102 and reflects off of the secondary reflector 201 can impinge upon the far focal point 104. The actual wave 53 that emanates from the surface of a volume energy source 10 can likewise reflect off of the secondary reflector 201 and impinge at a distance from the far focal point 104. In comparison, a theoretical wave 50 that emanates from the point source at the near focal point 102 and reflects off of the secondary reflector 25 can impinge upon the far focal point 104. The actual wave 52 that emanates from the surface of a volume energy source 10 can reflect off of the secondary reflector 25 and impinge at a distance from the far focal point 104. As can be seen, this distance is larger than that for the smaller secondary reflector as is used in disclosed system. The secondary reflector of the disclosed devices can reduce the impact of the angular error (1) by reducing the distance travelled between the secondary reflector and the target. Essentially, the distance traveled by actual wave 53 is shorter than the distance traveled by actual wave 52, which leads to less error in targeting a substrate that is held near the focal point 104.

Figure 7:
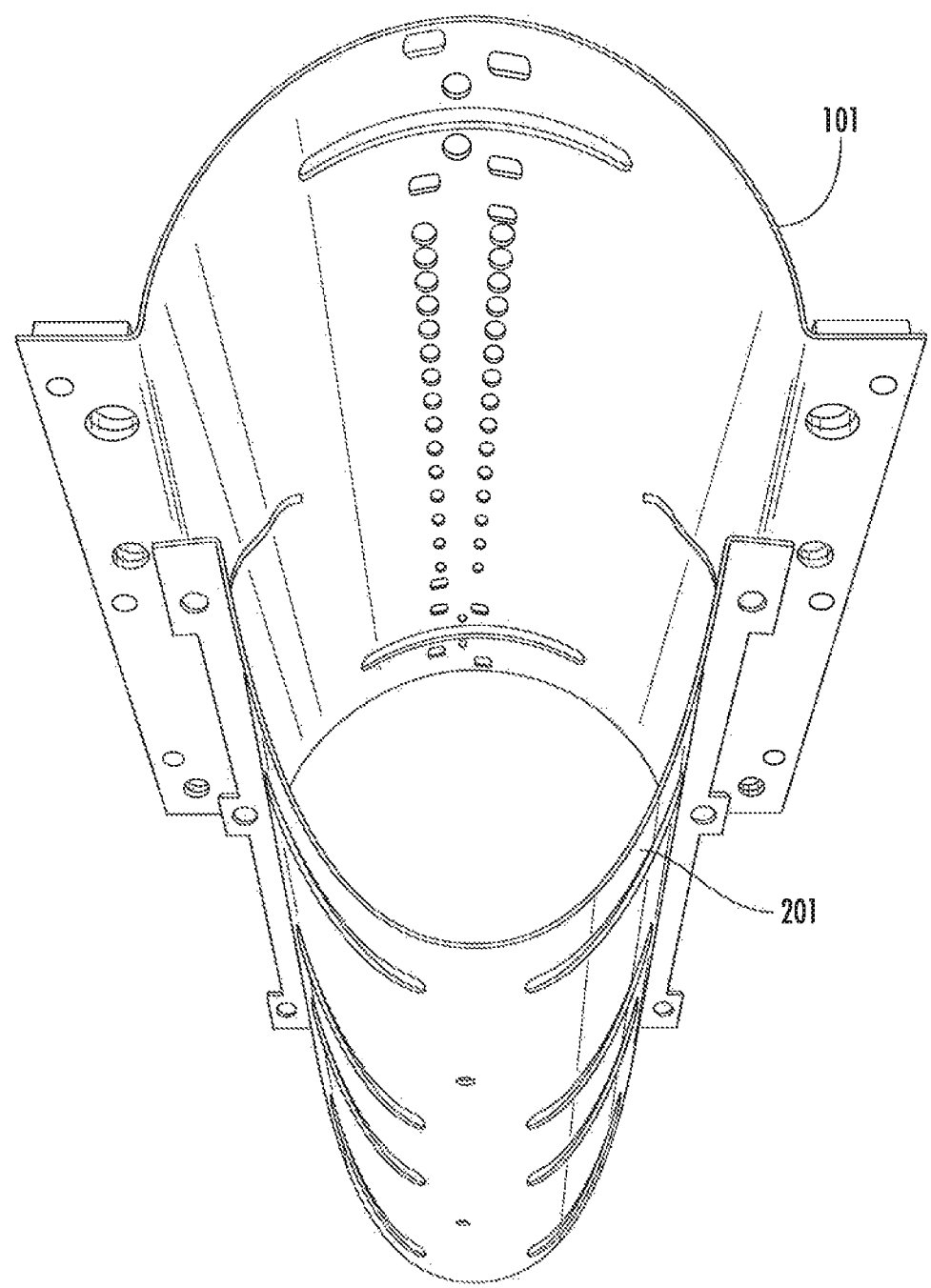
FIG. 7 is a perspective view of a reflector system as described herein.
Figure 9:
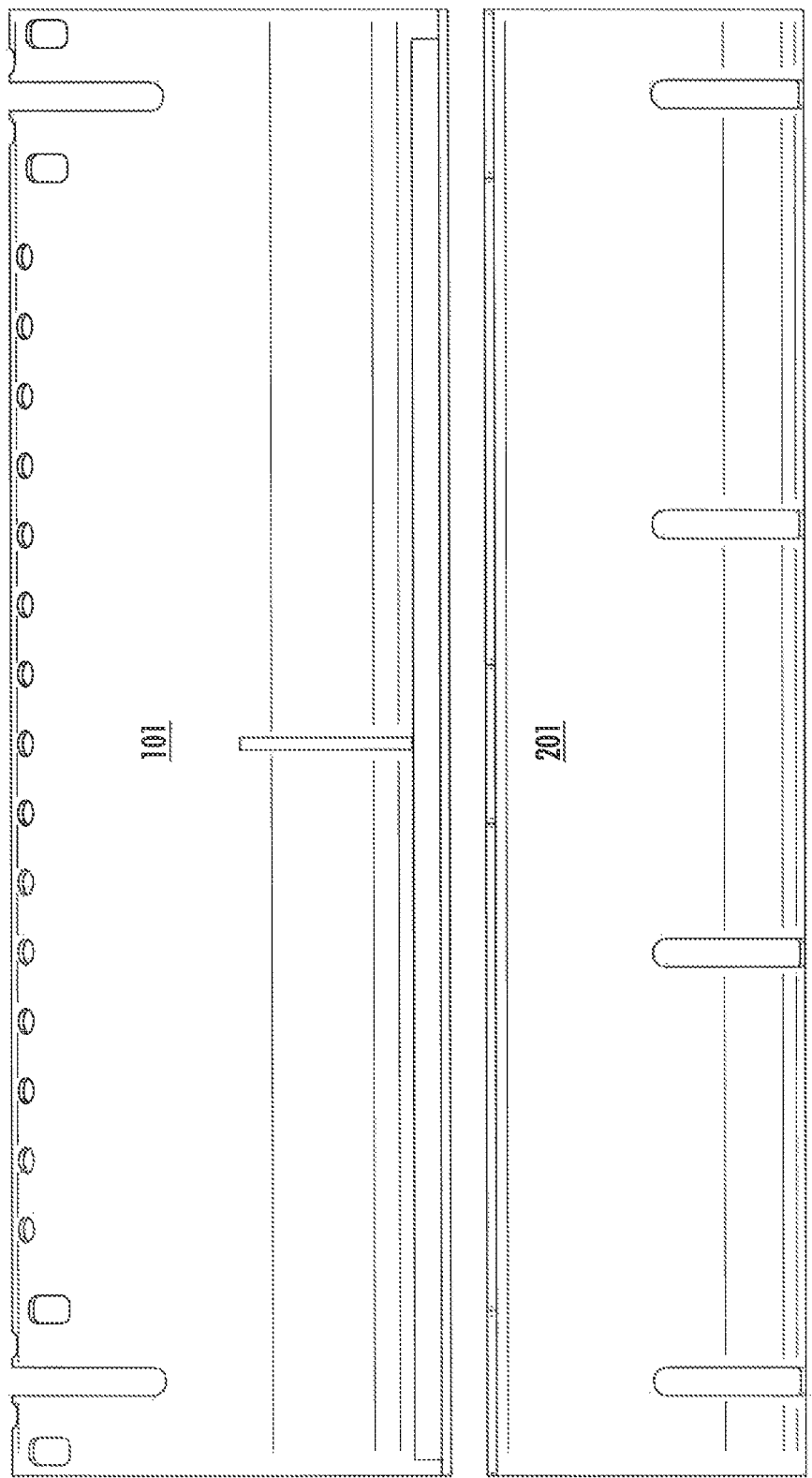
FIG. 9 is an elevation side view of the reflector system of FIG. 7.
Figure 10:
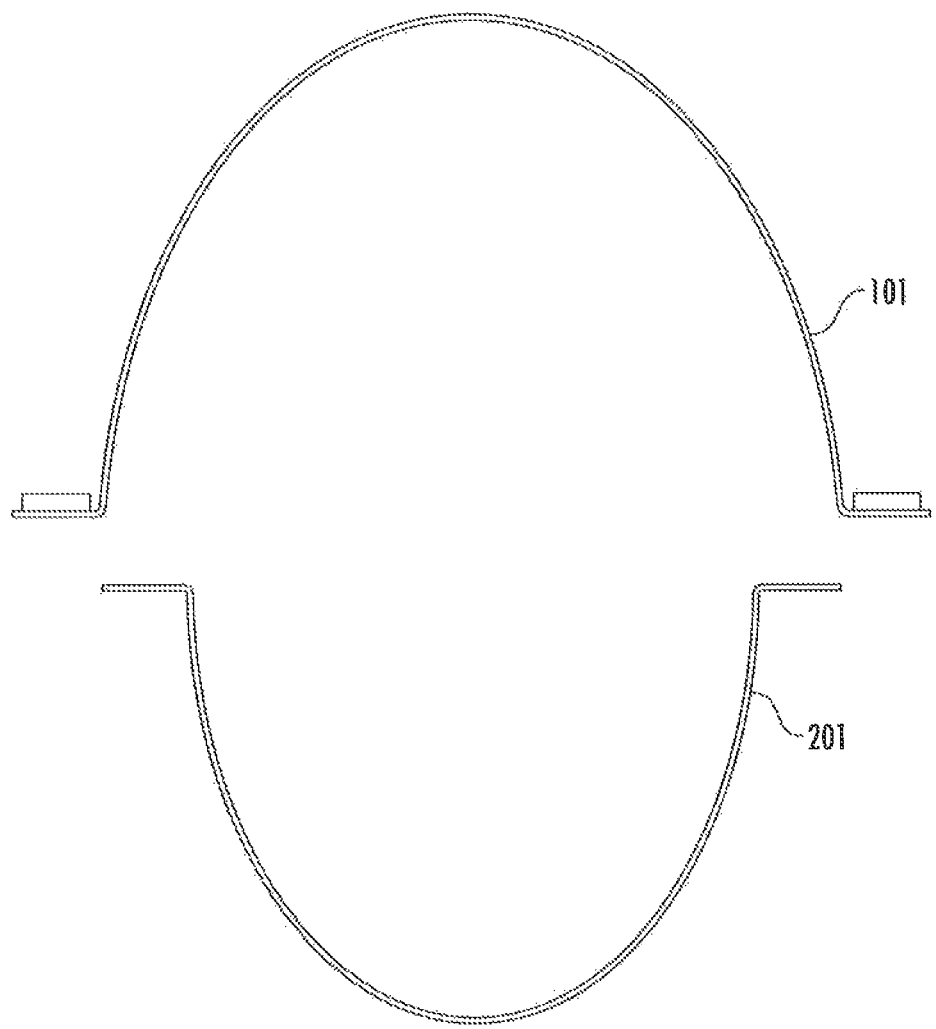
FIG. 10 is an elevation end view of the reflector system of FIG. 7.

FIG. 7 is a perspective view including a primary reflector 101 and a secondary reflector 201 held in the general alignment in which they can be located within a curing device. FIG. 9 is a side elevation view of the two reflectors, FIG. 10 is an end elevation view of the reflectors, FIG. 11 is a bottom view of the primary assembly of the reflectors, and FIG. 12 is a top view of the secondary assembly of the reflectors. As shown, the two reflectors 101, 201 can be about of the same axial height (e.g., within about ½ inch of the height of one another), though this is not a requirement of disclosed devices. The heights of the reflectors can vary widely, generally depending on the specific application. For instance, in one embodiment, the reflectors can be from about 4 inches to about 90 inches in height, or from about 6 inches to about 10 inches in some embodiments. In addition, it should be understood that various features of the two reflectors, e.g., the exact location of holes, vents, etc. may vary.

The reflectors can be formed to have a highly reflective surface, as is known in the art. For example, in one embodiment the reflectors can be formed of or coated with a substance that reflects ultraviolet and is nonabsorbent to microwave energy. The reflectors can be designed to reflect any desired radiative energy, including, for example, ultraviolet energy, infrared energy, and so forth. An aluminized coating that is applied by techniques well-known in the art can be used in one embodiment.

Figure 8:
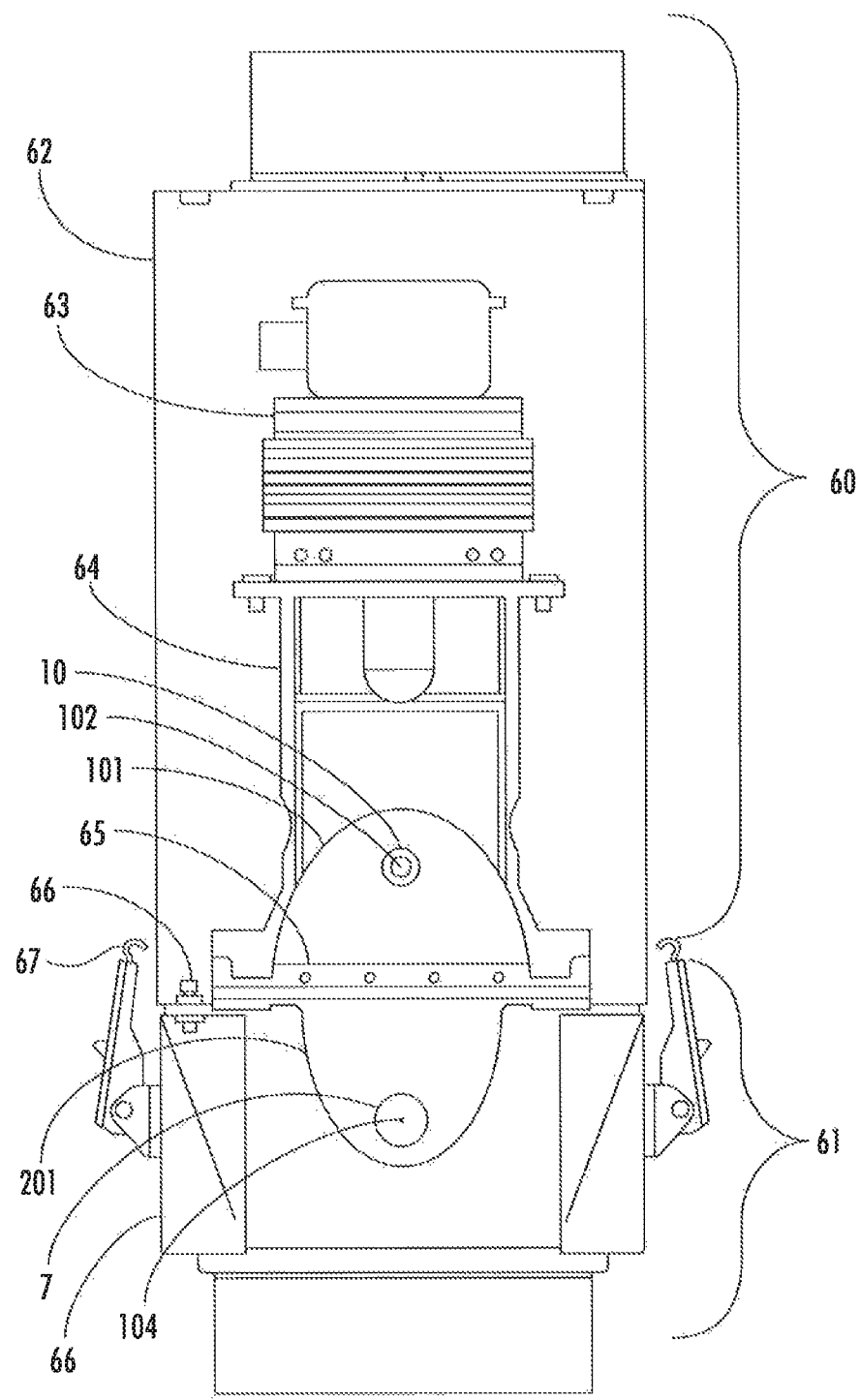
FIG. 8 illustrates one embodiment of a curing device as may incorporate a reflector system as disclosed herein.

FIG. 8 illustrates an apparatus that incorporates two separable subassemblies: the primary reflector assembly 60 and the secondary reflector assembly 61.

The primary reflector assembly 60 includes a housing 62, at least one magnetron 63 which supplies RF energy through one or more waveguides 64 to an RF cavity formed by a primary reflector 101, the two elliptical end reflectors 101, 201, and an RF-opaque screen 65 that allows UV light and cooling air to exit the primary reflector assembly. A radiant energy source 10 such as an electrodeless bulb can be positioned in the RF cavity at the near focal point 102 of the primary reflector 101 as discussed above. Apparatuses for energizing radiant energy sources such as electrodeless bulbs are well known in the art and thus are not discussed at length herein. One embodiment is described in U.S. Pat. No. 4,359,668 to Ury, which is incorporated herein by reference.

It should be understood that the device and methods disclosed herein are not limited by the radiant energy source and any type as is known in the art may be used, including, for example, visible, infrared, and/or ultraviolet radiant energy sources. In one embodiment, the radiant energy source is an electrodeless ultraviolet bulb energized by microwaves. In another embodiment, the radiant energy source can be a mercury arc lamp, for instance a medium pressure mercury arc lamp. The radiant energy source can include materials or devices that can alter the spectral output of the radiant energy. Other suitable examples of radiant energy sources can include, without limitation, light emitting diodes (e.g., in an array), halogen infrared lamps, and so forth.

The secondary reflector assembly 61 includes a housing 66, a secondary reflector 201, features as are generally known in the art to align the secondary reflector 201 to the primary reflector 101, features to mount an optional transparent quartz tube 7 in conjunction with the focal point 104, as shown, and a fastening method 67 to secure the secondary reflector assembly 61 to the primary reflector assembly 60.

As shown in FIG. 8, the radiant energy source 10 can be located essentially coincident with the near focal point 102 of the primary reflector 101. Alignment pins 66 can be used to properly locate the secondary reflector 201 with respect to the primary reflector 101.

During use a substrate that has been coated with a material to be cured, e.g., an optical fiber including an uncured polymeric coating, can pass through the far focal point 104 of the primary reflector 101. The substrate passes through the far focal point 104 in a direction that is essentially perpendicular to the major axes of the ellipses that define the primary reflector 101 and the secondary reflector 201.

The composition and curing of radiative energy curable coatings applied to substrates are well known in the art and thus are not described in detail herein. For instance, compositions that are useful as coatings, methods of applying the coatings and methods for curing the coating as by the use of ultraviolet radiation are described, for example, in U.S. Pat. No. 4,099,837 to Vazirani, U.S. Pat. No. 4,115,087 to Martin, U.S. Pat. No, 4,324,575 to Levy, and to U.S. Pat. No. 4,514,037 to Bishop et al., the contents of all of which are incorporated herein by reference. The substrate to be exposed to the radiant energy can be located in the elliptical space substantially coincident with the far focal point 104 as described previously.

In the illustrated embodiment, the device also includes a transparent quartz tube 7 that can be located on or near the far focal point 104. In one embodiment, the substrate can be passed through the quartz tube 7 and the radiant energy can contact the substrate within the quartz tube 7.

The apparatus as described herein may be used in a variety of processes in which a high aspect ratio substrate can coated with a material that can be treated with radiant energy. For example, in addition to utilization in conjunction with coated optical fibers, an apparatus may be used to cure ink or paint on a filament or rod-like substrates including, without limitation, yarns, filaments, pipes, cables, conduit, and so forth.

Components of a curing system can be utilized and replaced as necessary over the life of the system. For instance, both the primary and secondary reflectors can have a life span that is less than other components of the system. Hence, it may be financially expedient to replace such components when needed with suitable replacement parts. In one embodiment, the primary and/or secondary reflector can be provided as a replacement part for a curing apparatus. This may prove particularly beneficial for replacement of previously known, large secondary reflectors with the smaller reflectors described herein. Thus, the smaller secondary reflector may be provided as an individual component, in one embodiment.

In another embodiment, a plurality of the replaceable parts of a system can be provided together, such as in a kit of replacement parts for a system. A kit could include, for example, a primary reflector, and a smaller secondary reflector. In one embodiment, additional components of a system can also be included in a kit. For instance, a replacement kit can include, without limitation, a primary reflector, a secondary reflector, a replacement radiant energy source, screens of the assembly, and so forth.

The present invention may be better understood with reference to the Example, provided below.

EXAMPLE

A comparative output test was performed to compare reflector systems as previously known in the art and the disclosed systems. The same UV lamp module was used for both tests; only the secondary reflector assembly changed for the two tests. This test measured the relative intensity of UVA light in a 4 mm×4 mm square region centered on the focal point that was distant to the primary reflector. The data values were dimensionless and were valid for comparing the relative performance of the two systems. Table 1 presents the results of the prior art system and Table 2 presents the results of the disclosed system.

TABLE 1

| 6.554 | 6.125 | 5.839 | 6.077 | 6.077 |
|---|---|---|---|---|
| 7.433 | 7.181 | 6.909 | 7.059 | 7.129 |
| 7.771 | 7.923 | 8.002 | 7.851 | 7.729 |
| 6.579 | 6.759 | 6.841 | 6.741 | 6.516 |
| 5.716 | 5.755 | 5.779 | 5.734 | 5.594 |

In the prior art system the average intensity was 6.707, and the maximum intensity was 8.002.

TABLE 2

| 6.878 | 6.615 | 6.483 | 6.559 | 6.582 |
|---|---|---|---|---|
| 7.542 | 7.667 | 7.55 | 7.385 | 7.227 |
| 8.411 | 8.72 | 8.816 | 8.247 | 7.894 |
| 7.964 | 7.75 | 7.555 | 7.708 | 7.552 |
| 6.748 | 6.566 | 6.596 | 6.749 | 6.839 |

In the disclosed system, the average intensity was 7.384, and the maximum intensity was 8.816.

The present system increased average intensity by 10.1%, and the peak intensity was increased by 10.1%.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A device for curing a coating by use of radiant energy comprising:
   a primary reflector having a cross sectional shape that corresponds to an end portion of a first ellipse, the first ellipse having a major axis and a minor axis and a near focal point and a far focal point, the major axis of the first ellipse bisecting the primary reflector at a first point, the near focal point of the first ellipse being closer to the first point of bisection than is the far focal point of the first ellipse; and
   a secondary reflector having a cross sectional shape that corresponds to an end portion of a second ellipse, the second ellipse having a major axis and a minor axis and a near focal point and a far focal point, the major axis of the second ellipse bisecting the secondary reflector at a second point, the near focal point of the second ellipse being closer to the second point of bisection than is the far focal point of the second ellipse, the major axis of the first ellipse being longer than the major axis of the second ellipse and the minor axis of the first ellipse being longer than the minor axis of the second ellipse, the primary and secondary reflectors being aligned with one another such that the major axis of the first ellipse is collinear with the major axis of the second ellipse and such that the near focal point of the first ellipse essentially corresponds with the far focal point of the second ellipse and such that the far focal point of the first ellipse essentially corresponds with the near focal point of the second ellipse; and
   a radiant energy source, the radiant energy source being located such that it substantially overlays the near focal point of the first ellipse and the far focal point of the second ellipse.

2. The device of claim 1, wherein the length of the major axis of the second ellipse is from about 84% to about 95% of the length of the major axis of the first ellipse.

3. The device of claim 1, wherein the length of the minor axis of the second ellipse is from about 63% to about 96% of the length of the minor axis of the first ellipse.

4. The device of claim 1, wherein the primary and secondary reflectors reflect ultraviolet light.

5. The device of claim 1, wherein the primary and secondary reflectors absorb infrared energy.

6. The device of claim 1, wherein the primary reflector is a component of a primary reflector assembly.

7. The device of claim 6, wherein secondary reflector is a component of a secondary reflector assembly, the primary reflector assembly and the secondary reflector assembly being removably attachable to one another.

8. The device of claim 6, wherein the device further comprises a screen that allows UV light and air to exit the primary reflector assembly.

9. The device of claim 6, the device further comprising a transparent tube in conjunction with the first focal point of the second ellipse.

10. A method for curing a polymeric coating on a high aspect ratio substrate, the method comprising passing the high aspect ratio substrate through the device of claim 1, the high aspect ratio substrate being passed through the device along a line that passes through a point that essentially overlays the far focal point of the first ellipse and the near focal point of the second ellipse, the line running essentially perpendicular to the major axes of the first and second ellipses, wherein the high aspect ratio substrate comprises a photocurable polymeric material on a surface, the method further including curing the photocurable polymeric material by use of radiant energy.

11. The method of claim 10, wherein the substrate is an optical fiber.

12. The method of claim 10, wherein the substrate is a fiber, a filament, a yarn, a cable, a pipe, or a conduit.

13. The method of claim 10, wherein the radiant energy comprises ultraviolet energy, the photocurable polymeric material being cured by the ultraviolet energy.

14. A reflector for a device for curing a coating by use of radiant energy, the reflector comprising an aluminized coating, the reflector having a cross sectional shape that corresponds to an end portion of an ellipse, the ellipse having a major axis and a minor axis and a near focal point and a far focal point, the major axis of the ellipse bisecting the reflector at a point, the near focal point of the ellipse being closer to the point of bisection than is the far focal point of the ellipse, the major axis of the ellipse having a major axis of from about 5.10 inches to about 5.75 inches, and the minor axis of the ellipse having a length of from about 2.70 inches to about 4.05 inches.

15. The reflector of claim 14, wherein the reflector has a height that is from about 4 inches to about 90 inches.

16. The reflector of claim 14, wherein the reflector is removably attachable to a second reflector, the second reflector having a cross sectional shape that corresponds to an end portion of a second ellipse, the second ellipse having a major axis and a minor axis, wherein the major axis of the second ellipse is longer than the major axis of the ellipse of claim 14 and the minor axis of the second ellipse is longer than the minor axis of the ellipse of claim 14.

17. The reflector of claim 16, wherein the length of the major axis of the ellipse is from about 84% to about 95% of the length of the major axis of the second ellipse.

18. The reflector of claim 16, wherein the length of the minor axis of the ellipse is from about 63% to about 96% of the length of the minor axis of the second ellipse.

19. The reflector of claim 14, wherein the reflector is non-absorbent to microwave energy.

20. A kit of replacement parts for a device for curing a coating by use of radiant energy, the kit containing:
   a primary reflector having a cross sectional shape that corresponds to an end portion of a first ellipse, the first ellipse having a major axis and a minor axis and a near focal point and a far focal point, the major axis of the first ellipse bisecting the primary reflector at a first point, the near focal point of the first ellipse being closer to the first point of bisection than is the far focal point of the first ellipse; and
   a secondary reflector having a cross sectional shape that corresponds to an end portion of a second ellipse, the secondary reflector comprising an aluminized coating, the second ellipse having a major axis and a minor axis and a near focal point and a far focal point, the major axis of the second ellipse bisecting the secondary reflector at a second point, the near focal point of the second ellipse being closer to the second point of bisection than is the far focal point of the second ellipse, the major axis of the first ellipse being longer than the major axis of the second ellipse, and the minor axis of the first ellipse being longer than the minor axis of the second ellipse, wherein the primary reflector and the secondary reflector are removably attachable to one another.

21. The kit of claim 20, wherein the length of the major axis of the second ellipse is from about 84% to about 95% of the length of the major axis of the first ellipse.

22. The kit of claim 20, wherein the length of the minor axis of the second ellipse is from about 63% to about 96% of the length of the minor axis of the first ellipse.

23. The kit of claim 20, wherein the primary and the secondary reflector are about the same height as one another.

24. The kit of claim 23, wherein the primary reflector and the secondary reflector are from about 4 inches to about 90 inches in height.

25. The kit of claim 20, further comprising a source for radiant energy.

26. The kit of claim 20, wherein the source for radiant energy is an electrodeless bulb.

27. The kit of claim 20, further comprising all RF-opaque screen.

* * * * *